June 19, 1962  E. J. WALKER ET AL  3,040,234
ELECTRICAL CONTROL APPARATUS
Filed Aug. 19, 1959  2 Sheets-Sheet 1

United States Patent Office 3,040,234
Patented June 19, 1962

3,040,234
ELECTRIC CONTROL APPARATUS
Edward J. Walker, Buffalo, and Paul Christiansen, Cheektowaga, N.Y., assignors to Westinghouse Electric Corporation, East Pittsburgh, Pa., a corporation of Pennsylvania
Filed Aug. 19, 1959, Ser. No. 834,778
2 Claims. (Cl. 321—19)

The present invention relates generally to electrical control apparatus and more particularly relates to regulator systems.

Conventional regulator systems including saturation control of the magnetic amplifier is well known in the art. Many of these systems require a relaxation oscillator or saw tooth voltage generator having a signal which is combined with an error voltage derived from the system to produce controlled excitation of the magnetic amplifier. Such systems are complex and expensive to manufacture and maintain.

The present invention provides a regulator system utilizing the ripple of the direct-current output voltage of the system to control operation of the magnetic amplifier. In such a manner excellent results are obtained with respect to transient responses while obtaining satisfactory regulation over almost the entire range of load conditions.

Accordingly, an object of the present invention is to provide an improved regulator system.

Another object of the present invention is to provide an improved regulator system capable of maintaining a nearly constant direct-current output voltage with varying output current loads and with varying supply line voltage and frequency.

Another object of the present invention is to provide an improved regulator system for a direct-current power system responsive to the ripple of the direct-current output.

Another object of the present invention is to provide an improved regulator system for direct-current power system capable of satisfactory regulation from full load to a few percent of full load.

Further objects and advantages of the present invention will be readily apparent from the following detailed description taken in conjunction with the drawing, in which.

In general, the overall regulating system operates to provide boost excitation to a bridge magnetic amplifier in the form of periodic pulses determined by the ripple frequency of the direct-current output; each pulse having a width which is varied in accordance with the direct-current output voltage of the system in order to maintain the output voltage at a predetermined regulated value.

Figure 1:
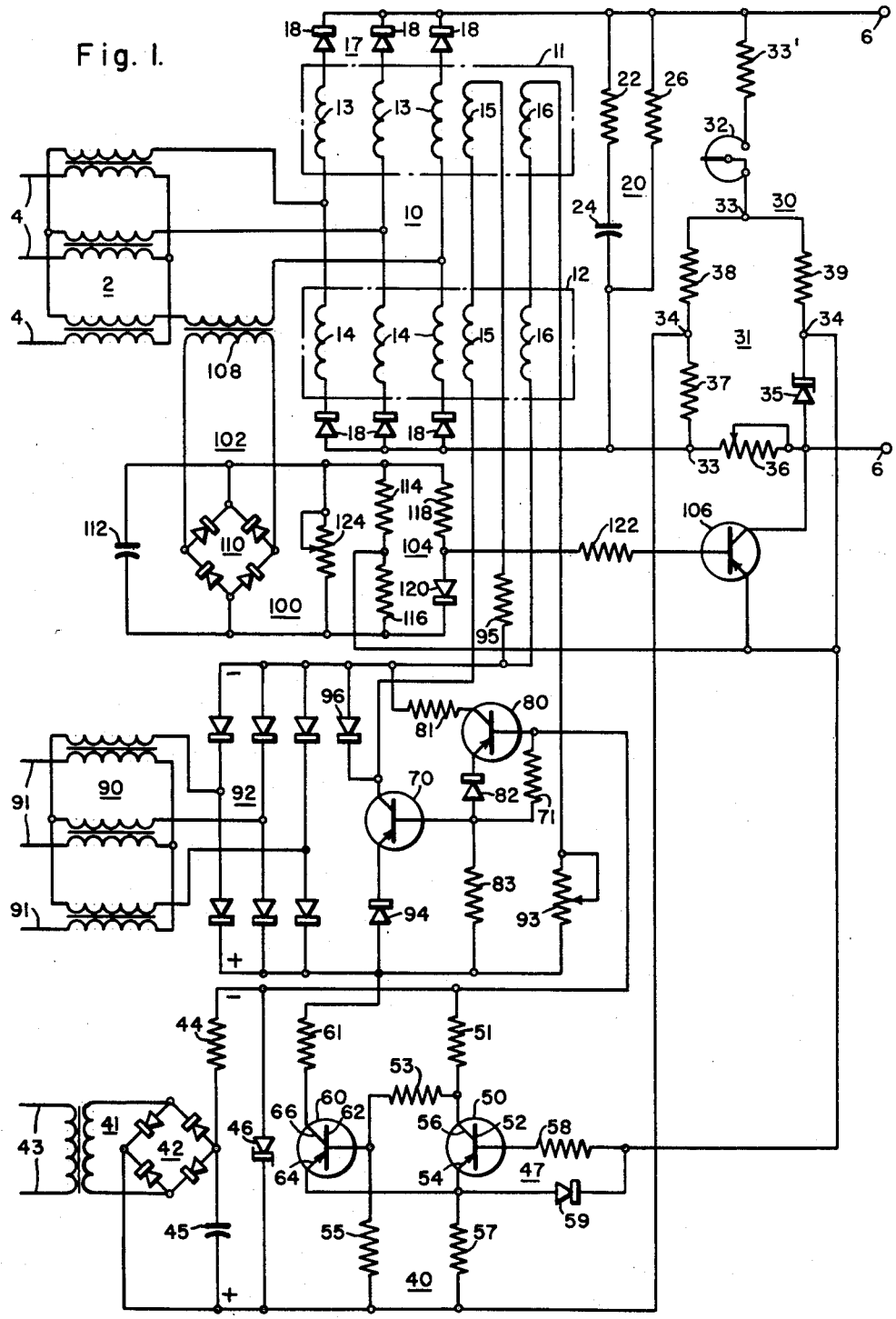
FIG. 1 is an electrical schematic diagram of an illustrative embodiment of the invention.

Referring to FIG. 1, a power transformer 2, having primary windings and secondary windings connected to the power lines 4 and a magnetic amplifier bridge circuit 10, respectively, provides power to the regulator system.

The magnetic amplifier bridge circuit 10 is illustrated as a pair of magnetic core segments 11 and 12, having inductively disposed thereon load windings 13 and 14 respectively, disposed in a three-phase bridge arrangement. A feedback or boost winding 15 is equally disposed on each magnetic core segment 12 and 13. A bias winding 16 is similarly disposed in magnetic relation to the core segments 11 and 12. The boost winding 15 and bias winding 16 are adapted to determine a saturation level of the magnetic amplifier circuit 10 in a manner to be discussed hereinafter.

A three-phase full wave rectifier bridge 17, comprising rectifier elements 18, converts the alternating current power from the load windings 13 and 14 to direct-current power having a ripple component with a fundamental frequency equal to six times the input frequency. Of course, the fundamental frequency of the ripple component of the direct-current power from the rectifier bridge circuit may be of other multiples of the input frequency through selection of other bridge configurations for the load windings 13 and 14 and full wave rectifier bridge 17, as is well known in the art.

A surge limiting circuit 20, comprising a resistive element 22 serially connected with a capacitive element all in shunt relation with resistive element 26, is operatively connected to the output terminals 6 of the three phase full wave rectifier circuit 17 to protect the rectifying elements 18 from surges originating on the input side of the regulator system.

An error detecting circuit 30, comprising a reference bridge circuit 31, a rheostat 32 and a voltage dropping resistor 33' connected in series circuit relationship, is connected across the direct-current output of the regulator system as the output appears across the terminals 6.

The reference bridge circuit 31 comprises input terminals 33, output terminals 34 and four impedance legs connected in the usual manner. A Zener diode 35 and variable resistor 36 are serially connected in one leg of the reference bridge circuit 31. The other legs comprise resistive elements 37, 38 and 39 respectively.

It will be understood that a Zener diode is a semiconductor rectifier, usually a silicon diode, which has the characteristic of blocking current flow in one direction when the voltage is below a predetermined breakdown value while current is permitted to flow freely when the voltage is above that predetermined value. The breakdown is non-destructive so that the current is cut off when the voltage again drops below the breakdown value. Of course, any device with a breakdown region as described can be used. The Zener diode 35 is selected to have a predetermined breakdown value thereby providing a constant voltage drop in the reference bridge circuit 31 while conducting different currents.

By proper selection of the variable resistor 36 and setting of the rheostat 32, as well as proper selection of the resistive values of the resistors 37, 38 and 39, a sample voltage of the direct-current output appearing across the output terminal 6 can be applied to the reference bridge circuit 31 so as to have no voltage difference between the output terminals 34.

In operation, the rheostat 32 is initially adjusted for a desired range of sample voltage to the input terminals 33 of the reference bridge circuit 31. The Zener diode 35 and variable resistor 36 provide a reference voltage value having a constant component resulting from the Zener diode 35 and a variable component as determined by the setting of the variable resistor 36. The reference voltage value of this particular leg is proportionally selected to have a magnitude less than the maximum instantaneous value of the desired rectified output appearing across the terminal 6 and greater than the minimum instantaneous value. By proper selection of the reference voltage value in the area between maximum instantaneous value and minimum instantaneous value of the sampled rectified output, a voltage difference will exist across the output terminals 34 of the reference bridge circuit 31 having a polarity which will be dependent upon whether the voltage across the resistive element 37 is above or below the reference voltage value determined by the leg containing the Zener diode 35 and variable resistor 36. In operation, the voltage across the Zener diode 35 remains substantially constant since the voltage across the input terminals 33 as selected by the rheostat 32 is always of sufficient magnitude to cause breakdown of the Zener diode 35. Therefore, in the normal range of operation of the regulator system as illustrated, only one polarity of output voltage, hereinafter referred to as the error signal, will appear across the output terminals 34.

Connected across the output terminals 34 of the reference bridge circuit 31 is a monostable triggering circuit 40 including a power supply 41 and filtering circuit 45.

The power supply 41 for the monostable triggering circuit 40 is shown to include a single phase transformer connecting a single phase full wave bridge circuit 42 to a single phase power line having leads 43. The output terminals of the single phase full wave rectifier bridge circuit 42 provides biasing potential for the monostable triggering circuit 40. A capacitor 45 filters the D.C. bias potential while a Zener diode 46 connected in series relation with a resistor 44 across the capacitor 45 regulates the bias potential supply to a constant value ensuring consistency of performance of the monostable triggering circuit 40 under duplicate conditions.

The monostable triggering circuit 40 also includes a transistor 50 having a base electrode 52, emitter electrode 54 and collector electrode 56, and a transistor 60 having a base electrode 62, emitter electrode 64 and collector electrode 66.

The collector 56 is negatively biased through a current limiting resistor 51 and is also connected to the base electrode 62 through an isolating impedance 53. The base electrode 62 is positively biased through the resistor 55. The emitter electrodes 54 and 64 are tied together and positively biased through the resistor 57.

The transistors are illustrated as of the PNP type so that upon appearance of an error signal of proper polarity from the reference bridge circuit 31 across the base electrode 52 and emitter electrode 54 through the isolating impedance 58, the transistor 50 will become fully conductive simulating a switch in the closed position.

Prior to the application of an error signal to the monostable triggering circuit the transistor 60 is biased to be in its conductive state while the transistor 50 is biased to be in its nonconductive state. Upon appearance of an error signal of proper magnitude and polarity the transistor 50 is rendered conductive which, in turn, causes the transistor 60 to be rendered nonconductive. Thus, the output waveform resulting from the transistor 60 operating in a switching mode is a square wave voltage signal which appears across a resistor 61 connected to the collector electrode 66 with an "on" time and "off" time determined by the duration of the error signal appearing across the output terminals 34 of the reference bridge circuit 31. A current shunting silicon diode 59 connects the emitter electrodes 64 and 54 to the current limiting impedance 58, thereby protecting the transistor 50 from excessive base current if the error signal should become exceedingly large.

The current output from the transistor 60 is amplified by switching transistors 70 and 80 and control the output current pulses fed to the boost winding 15 of the power magnetic amplifier 10. To bias the transistors 70 and 80 and provide power for the boost winding 15 and bias winding 16, a three phase power transformer 90, having primary windings connected to the three phase power lines 91, connects to a three phase rectifier circuit 92 through the secondary windings of the power transformer 90. The bias winding 16 serially connected with a variable resistor 93 is connected across the output terminals of the three phase full wave rectifier circuit 92. The boost winding 15, the collector-emitter circuit of the transistor 70, a rectifier element 94, and a current limiting resistor 95 in series circuit relationship are also connected across the output terminals of the bridge circuit 92. A rectifier element 96 is connected across the boost winding 15 and the current limiting resistor 95 to allow the current pulses in the boost winding 15 to discharge without any significant surges appearing across the transistor 70. The base electrode of the transistor 80 is connected to the emitter electrode 56 of the transistor 50 through the resistor 51, while the base electrode of the transistor 70 is connected in the same manner but with an additional resistive element 71. The collector electrode of the transistor 80 is negatively biased through the resistor 81, while the emitter electrode is positively biased through a rectifier element 82 and resistive element 83 to the positive side of the rectifier bridge 92.

The amplifier circuit comprising the transistors 70 and 80 are biased to further amplify the output from the transistor 60 of the monostable triggering circuit 40 to provide an output current pulse in the boost windings 15 whenever a signal pulse results from the monostable triggering circuit 40.

Figures 2, 3:
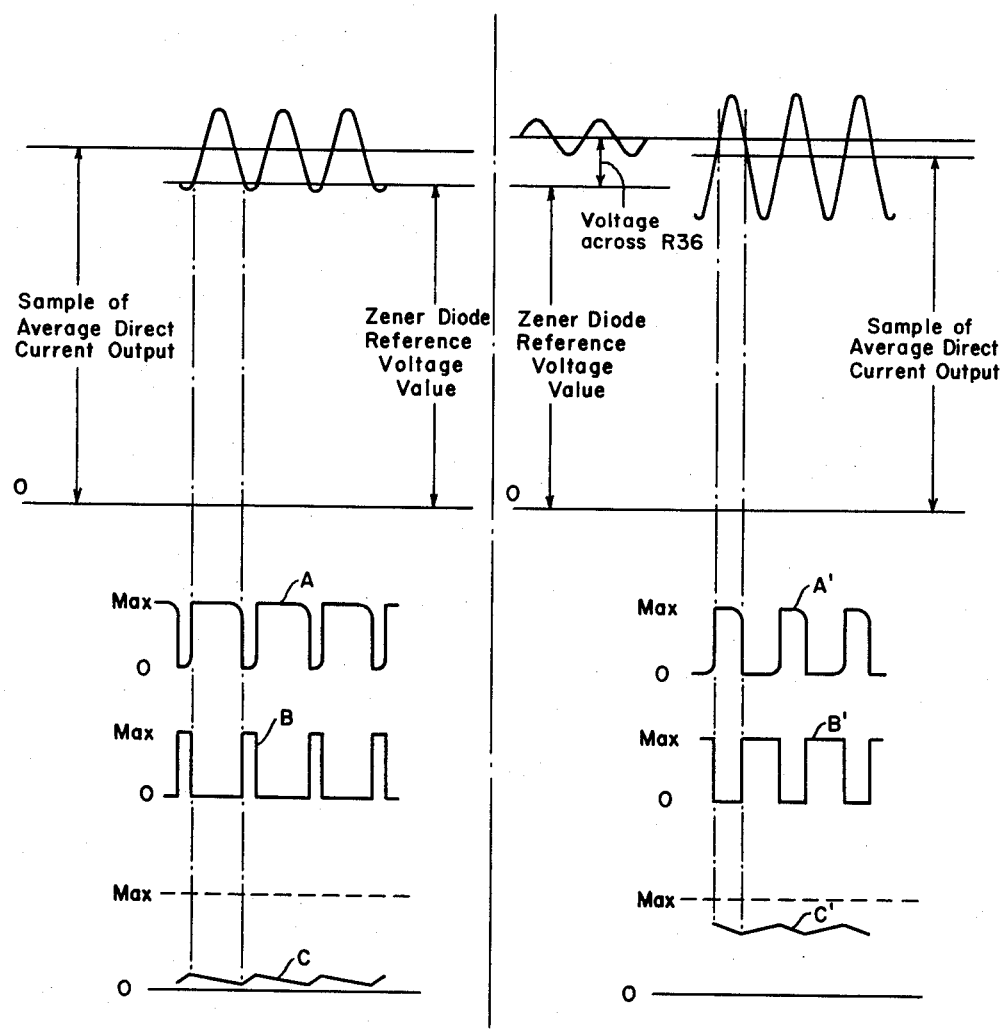
FIG. 2 is a graphical representation of waveforms illustrating the operation of the illustrative embodiment shown in FIG. 1 at no load conditions.
FIG. 3 is a graphical representation similar to FIG. 2 except for operation at full load conditions.

The operating characteristics of the regulator circuit thus far described can readily be seen by reference to FIGS. 2 and 3. Assume that the rheostat 32 has been set to provide an average voltage across the resistor 37 in one leg of the reference bridge circuit 31 of, say, eleven volts, while the leg containing the Zener diode 35 and variable resistor 36 have been established at a reference voltage value of, say, ten volts. As the instantaneous value of the direct current regulated power output appearing across the output terminals 6 varies with the fundamental frequency of the ripple and is sampled as exceeding the reference voltage value, an error signal will result across the output terminals 34 causing the transistor 50 to be rendered conductive with an output voltage appearing across the resistor 51 as shown by the waveform A. In turn the transistor 60 is rendered nonconductive and hence has an output waveform across the resistor 61 shown by the waveform B. Under no load conditions the voltage drop across the variable resistor 36 in the leg containing the Zener diode 35 can be assumed to be negligible since the voltage drop across the variable resistor 36 is a function of the regulated output current. However, under full load conditions the voltage drop across the variable resistor 36 is significant in adding a voltage drop to the Zener diode voltage drop thereby having the effect of increasing the reference voltage value as compared to the predetermined regulated D.C. output desired at the terminals 6, so that whenever the instantaneous value of the sample voltage is less than the reference voltage value, the transistor 50 is rendered nonconductive as shown by the output waveform A' and the transistor 60 is rendered conductive as shown by the output waveform B'.

Thus, if the average D.C. output voltage appearing across the output terminals 6 should rise above its preselected desired regulated value, the reference bridge circuit 31 will turn the transistor 50 "on" for a longer period of time per ripple cycle, which, in turn, will force the transistor 60 "off" for a longer time period per ripple cycle. Transistors 70 and 80 will also turn "off" for a longer time period for each ripple cycle. The average boost current will drop to a lower value. This would desaturate the magnetic amplifier 10 slightly, allowing less alternating current voltage to appear across the rectifier bridge circuit 17. In this manner the average D.C. output voltage appearing across the output terminals 6 would again be reduced to its predetermined desired regulated value.

If the average direct-current output voltage should become less than its desired predetermined regulated value, the reference bridge circuit 31 would turn transistor 50 "off" for a longer time period for each ripple cycle. Transistor 60 would be "on" for a longer time period for the same ripple cycle. Transistors 70 and 80 would also turn "on" for a longer time period for the same ripple cycle. Thus, the average boost current would rise to a higher value. In so doing the magnetic amplifier 10 would saturate to a greater degree allowing more alternating current voltage to appear across the power rectifier circuit 17, causing the average direct-current output voltage appearing across the output terminals 6 to rise to the predetermined desired regulated value.

From FIGS. 2 and 3 it can be seen from the waveforms C and C' that the average boost current flowing through the boost windings of the magnetic amplifier 10 can be increased with increasing load conditions by adjusting the voltage drop across the variable resistor 36 in the Zener diode leg of the reference bridge circuit 31. Since the point of regulation on the ripple cycle is different than the average value of the direct-current output at different loads, the variable resistor 36 functions as a load compensating resistor. As explained previously, resistor value 36 raises the reference voltage magnitude in that leg of the reference bridge circuit 31 for increases in load current. By adjusting the value of the resistance of the variable resistor 36, the regulation of the output direct-current voltage appearing across the output terminal 6 can be made dropping, flat or rising as preferred.

In addition, the regulator system is provided with a current limiting protection circuit 100. The current limiting protection circuit 100, in general, comprises an input circuit 102, a detection bridge circuit 104 and a transistor 106. A current transformer 108 is connected to respond to the output load current flowing in the load windings 13 and provide an alternating current voltage to a single phase full wave bridge circuit 110. The bridge circuit 110 rectifies the alternating current voltage to a direct-current voltage which is filtered by a capacitor 112 connected across the output terminals of the bridge circuit 110. The filtered direct-current voltage appears across the bridge circuit 104 comprising resistors 114, 116 and 118 and a semiconductor diode 120. As the load current increases the direct-current voltage across the bridge circuit 104 increases until a voltage of sufficient magnitude appears across the output terminals of the bridge circuit 104 through a resistor 122 to the base-emitter circuit of the transistor 106 to cause current flow in the emitter-collector circuit of the transistor 106. The emitter and collector electrodes of the transistor 106 are connected across the Zener diode 35 in the reference bridge circuit 31. When the transistor 106 is rendered conductive, the Zener diode 35 is effectively short-circuited thereby rendering the reference bridge circuit 31 inoperative. A variable resistor 124 is connected across the output terminals of the single phase full wave bridge circuit 110 thereby affording means for adjusting the direct-current voltage appearing across the bridge circuit 104. Thus, the variable resistor 124 determines the maximum current output that will be allowed prior to the boost current being entirely withheld from the boost windings 15 because of excessive increase in the load current of the regulator system.

The present invention has provided excellent results in response to switching transients, in that an elapsed time of only a few hundreds of a second was necessary to completely recover from switching a relatively small load to an extremely large load and back again to the small load. Because of the superior performance of the invention manufacturing costs can be reduced by using cut "C" cores construction rather than uncut cores construction and the weight and size are less through the use of the magnetic amplifier in a self saturating circuit.

While this invention has been described with a certain degree of particularity for the purposes of illustration, it is to be understood that all alterations, equivalence, and modification within the spirit and scope of the invention are herein meant to be included.

We claim as our invention:

1. In a regulated power system; magnetic amplifier means including saturable means having inductively disposed thereon an output winding means, fedback winding means and bias winding means, said bias winding means adapted to be connected to a voltage source, said output winding means adapted to be connected to a power source and provide an output as a function of the saturation of said saturable means; means for rectifying the output of said output winding means; reference bridge means for comparing the rectified output to a reference value and providing an error signal which is a function of the difference between said rectified output and said reference value whereby the time duration of said error signal during each ripple cycle of the rectified output is dependent upon the magnitude of said difference; mono-stable triggering means operably connected to said reference bridge means for producing a signal pulse in the absence of an error signal; means for amplifying said signal pulse from the mono-stable triggering means; and switching means responsive to said amplified signal pulses for controlling excitation to said feedback winding means.

2. In a regulated power system; magnetic amplifier means including saturable means having inductively disposed thereon an output winding means, feedback winding means and bias winding means, said bias winding means adapted to be connected to a voltage source, said output winding means adapted to be connected to a power source and provide an output as a function of the saturation of said saturable means; means for rectifying the output of said output winding means; reference bridge means for comparing the rectified output to a reference value and providing an error signal which is a function of the difference between said rectified output and said reference value whereby the time duration of said error signal during each ripple cycle of the rectified output is dependent upon the magnitude of said difference; mono-stable triggering means operably connected to said reference bridge means for producing a signal pulse in the absence of an error signal; means for energizing said mono-stable triggering circuit with a constant potential source so as to provide duplicate signal pulses in the absence of a given error signal; means for amplifying said signal pulse from the mono-stable triggering means; and switching means responsive to said amplified signal pulses for controlling excitation to said feedback winding means.

References Cited in the file of this patent
UNITED STATES PATENTS

| | | |
|---|---|---|
| 2,809,341 | Silver | Oct. 8, 1957 |
| 2,810,877 | Silver | Oct. 22, 1957 |
| 2,814,773 | Comins et al. | Nov. 26, 1957 |
| 2,858,499 | Silver | Oct. 28, 1958 |
| 2,914,720 | Merkel | Nov. 24, 1959 |
| 2,937,328 | Hugh et al. | May 17, 1960 |
| 2,961,594 | Mah | Nov. 22, 1960 |